US011338976B2

(12) United States Patent
Oag et al.

(10) Patent No.: US 11,338,976 B2
(45) Date of Patent: May 24, 2022

(54) CONTACT LENS BLISTER PACKAGE, BASE MEMBER FOR A CONTACT LENS BLISTER, SEALING MEMBER FOR A CONTACT LENS BLISTER AND RELATED METHODS

(71) Applicant: CooperVision International Limited, Fareham (GB)

(72) Inventors: Robert Oag, Southampton (GB); Adam Fieldhouse, Limerick (IE)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 411 days.

(21) Appl. No.: 16/086,015

(22) PCT Filed: Mar. 22, 2017

(86) PCT No.: PCT/GB2017/050800
§ 371 (c)(1),
(2) Date: Sep. 18, 2018

(87) PCT Pub. No.: WO2017/168122
PCT Pub. Date: Oct. 5, 2017

(65) Prior Publication Data
US 2019/0092545 A1    Mar. 28, 2019

Related U.S. Application Data

(60) Provisional application No. 62/313,826, filed on Mar. 28, 2016.

(51) Int. Cl.
*H02J 7/00*     (2006.01)
*B65D 75/32*    (2006.01)
(Continued)

(52) U.S. Cl.
CPC .......... *B65D 75/325* (2013.01); *A45C 11/005* (2013.01); *B65B 11/52* (2013.01);
(Continued)

(58) Field of Classification Search
CPC .................................................. B65D 75/325
(Continued)

(56) References Cited

U.S. PATENT DOCUMENTS 5,467,868 A * 11/1995 Abrams ................ A61F 2/1691
206/5.1
8,881,892 B1   11/2014 Linhardt et al.
(Continued)

FOREIGN PATENT DOCUMENTS

CN   1091385 A    8/1994
EP   2620802   *  7/2013
(Continued)

OTHER PUBLICATIONS

Battery Insulating Pull Tabs, Mar. 9, 2018, Keystone, Keyelco (Year: 2018).*
(Continued)

*Primary Examiner* — Yalkew Fantu
(74) *Attorney, Agent, or Firm* — Kilyk & Bowersox, P.L.L.C.

(57) ABSTRACT

A contact lens blister package 1 includes (i) a cavity 4 for storing a contact lens 20 and (ii) charging circuitry 3 configured to charge an electronic device 22 forming part of a contact lens 20 stored in said cavity 4. Related methods are also described.

16 Claims, 2 Drawing Sheets

(51) Int. Cl.
*H02J 50/12* (2016.01)
*H02J 7/02* (2016.01)
*A45C 11/00* (2006.01)
*B65B 11/52* (2006.01)
*B65B 25/00* (2006.01)

(52) U.S. Cl.
CPC .............. *B65B 25/008* (2013.01); *H02J 7/00* (2013.01); *H02J 7/0042* (2013.01); *H02J 7/025* (2013.01); *H02J 50/12* (2016.02); *B65D 2575/3245* (2013.01); *B65D 2585/545* (2013.01); *H02J 2207/20* (2020.01)

(58) Field of Classification Search
USPC ........................................................ 320/108
See application file for complete search history.

(56) References Cited

U.S. PATENT DOCUMENTS

| | | | | |
|---|---|---|---|---|
| 2005/0258053 | A1* | 11/2005 | Sieg | A45C 11/005 206/5.1 |
| 2007/0000792 | A1* | 1/2007 | Newman | B65D 83/0418 206/5.1 |
| 2007/0284263 | A1* | 12/2007 | Giardina | A45C 11/005 206/5.1 |
| 2010/0259719 | A1* | 10/2010 | Sabeta | A45C 11/005 351/159.06 |
| 2015/0173474 | A1 | 6/2015 | Barrows et al. | |
| 2015/0281411 | A1* | 10/2015 | Markus | G02C 7/04 455/556.1 |
| 2018/0102663 | A1* | 4/2018 | Jung | H02J 7/0042 |

FOREIGN PATENT DOCUMENTS

| | | |
|---|---|---|
| EP | 2620802 A1 | 7/2013 |
| WO | 2015191248 A1 | 12/2015 |

OTHER PUBLICATIONS

Office Action issued in corresponding Chinese Patent Application No. 201780020171.2 dated May 5, 2019 with English translation (16 pages).
International Search Report and Written Opinion issued in corresponding International Patent Application No. PCT/GB2017/050800 dated May 22, 2017 (12 pages).
Demand filed Jan. 25, 2018 in corresponding International Patent Application No. PCT/GB2017/050800 (12 pages).
Written Opinion of the International Preliminary Examining Authority issued in corresponding International Patent Application No. PCT/GB2017/050800 dated Feb. 19, 2018 (7 pages).
Response to Written Opinion of the International Preliminary Examining Authority filed Apr. 19, 2018 in corresponding International Patent Application No. PCT/GB2017/050800 (15 pages).
International Preliminary Report On Patentability issued in corresponding International Patent Application No. PCT/GB2017/050800 dated Jun. 20, 2018 (19 pages).

* cited by examiner

CONTACT LENS BLISTER PACKAGE, BASE MEMBER FOR A CONTACT LENS BLISTER, SEALING MEMBER FOR A CONTACT LENS BLISTER AND RELATED METHODS

FIELD

This invention relates to the field of contact lens containers. In particular, but not exclusively, the invention provides a contact lens blister package for use with a contact lens containing an electronic device.

This application is a National Stage Application of PCT/GB2017/050800, filed Mar. 22, 2017, which claims the benefit under 35 U.S.C. § 119(e) of prior U.S. Provisional Patent Application No. 62/313,826, filed Mar. 28, 2016.

BACKGROUND

Recent advances in microelectronics have led to renewed interest in the idea of incorporating electronic devices into contact lenses. One issue that needs to be addressed with such technology is how to power the electronic device.

In commercial scale contact lens manufacture, particularly of disposable contact lenses, there may be a significant delay between a lens leaving a manufacturing facility and its use by the end user. A charge stored in a battery or capacitor contained within the contact lens may dissipate during this time. Accordingly, it would be advantageous to provide an improved method and apparatus for providing a power supply to electronic components located inside a contact lens.

SUMMARY

Briefly and in general terms, the present invention provides methods and apparatus for providing an energy supply to an electronic device or component located inside a contact lens.

This invention provides, in a first aspect, a contact lens blister package comprising (i) a cavity for storing a contact lens and (ii) charging circuitry configured to charge an electronic device forming part of a contact lens stored in said cavity.

The invention provides, in a second aspect, a method of providing a charge to an electronic device contained within a contact lens, the method comprising sealing the contact lens into a blister package comprising charging circuitry configured to charge the electronic device.

The invention provides, in a third aspect, a method of manufacturing a packaged electronic contact lens, the method comprising placing the contact lens, such as a hydrogel or silicone hydrogel contact lens, containing one or more electronic components, in a cavity of a blister pack comprising charging circuitry configured to charge the electronic device, and then sealing the blister pack with the contact lens contained within the cavity.

In further aspects, the invention provides a base member and/or a sealing member for a contact lens blister package including circuitry configured for use as the charging circuitry of any other aspect.

It will be appreciated that features described in relation to one aspect of the present invention can be incorporated into other aspects of the present invention. For example, any of the features described with reference to the apparatus of the invention may be incorporated into the method of the invention, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the scope of the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Examples of the methods and apparatus of the present invention will now be described, by way of example only, with reference to the accompanying drawings, in which.

DETAILED DESCRIPTION

Figure 1:
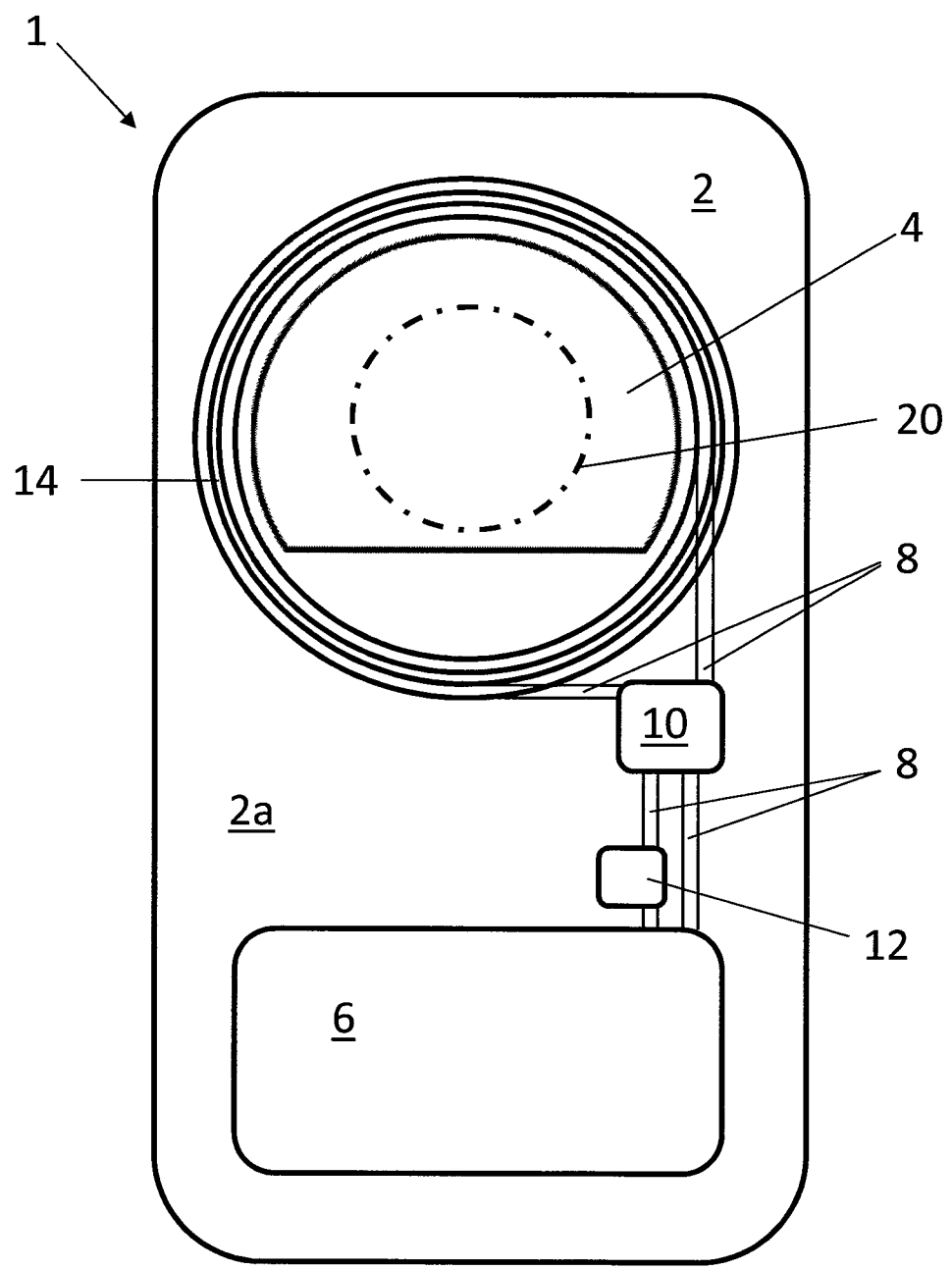
FIG. 1 is a schematic plan view of part of a blister package in accordance with a first example embodiment.

Embodiments are described herein in the context of improved methods and systems for the manufacture of contact lenses incorporating electronic components.

Those of ordinary skill in the art will realize that the following detailed description is illustrative only and is not intended to be in any way limiting. Other embodiments of the present invention will readily suggest themselves to such skilled persons having the benefit of this disclosure. Reference will be made in detail to implementations as illustrated in the accompanying drawings. The same reference indicators will be used throughout the drawings and the following detailed description to refer to the same or like parts.

As previously stated, a first aspect of the invention is directed to a contact lens blister package. The blister package comprises a cavity for storing a contact lens. The blister package further comprises charging circuitry configured to charge an electronic device forming part of a contact lens stored in said cavity. A wider variety of power sources and/or larger power sources may be included in a blister package as compared to a contact lens, and this may facilitate designs in which the power source in the blister pack can store more charge over a longer period as compared to a power source located in a contact lens.

Contact lens blister packages (also known as blister packs) are a form of contact lens primary package well known in the art. Blister packages are used for storage of contact lenses following manufacture of the lens and prior to first use of the lens. Contact lenses are typically stored in blister packages for a period of months or a number of years (e.g. 0 to 7 years). The contact lens is typically stored in a fluid, such as a buffered saline solution, in a sealed cavity in the blister package. WO 2008/070782, the contents of which are incorporated herein by reference, describes an example blister pack. Another form of blister package is described in WO 03/016175. It will be appreciated that the present invention may be applicable to blister packs having a wide range of shapes and configurations.

The blister package comprises a base member. The base member may comprise a recess dimensioned to receive a contact lens. The recess may form, at least in part, the cavity in which the contact lens is stored. The base member may further comprise a flange portion outwardly extending from the recess. The blister package may comprise a sealing member arranged to close off the recess and provide a liquid tight seal for the contact lens located in the cavity. Thus, the cavity of a blister pack may be formed by the recess when closed off by the sealing member. The sealing member may be removably attached to the base member, for example the flange. The sealing member may comprise a foil lid. The blister package may be configured to be disposable.

A plurality of blister packages can be coupled together to form an array of contact lens blister packages. An array of blister packages may for example consist of two, three, four, five, six, or more blister packages arranged in a strip.

A blister package is an example of a primary contact lens package. A plurality of blister packs may be contained in a secondary package. The secondary package may be arranged to receive a plurality of sealed blister packages, for example a plurality of sealed blister packages arranged in arrays. The secondary package may comprise a carton.

The charging circuitry may comprise a power source. The power source may be arranged to supply a current to an induction coil. The power source may comprise a battery, solar storage (e.g. energy storage co-located with photo voltaic cells) or other element arranged to retain an electrical charge.

The charging circuitry may comprise a DC/AC converter arranged to convert a direct current from the power source into an alternating current. In the case that the power source is a battery, the charging circuitry may include a DC/AC converter arranged to turn direct current from the battery into an alternating current.

The charging circuitry may be configured to charge the electronic device wirelessly.

The charging circuitry may comprise an antenna, for example a first induction coil, arranged to produce an alternating electromagnetic field. The induction coil may be arranged to receive current from the power source and to provide power wirelessly to the electronic device. The induction coil may be located in the blister pack such that, in use, a contact lens received in the cavity will experience the electromagnetic field generated by the coil. The induction coil may be located in (for example be attached to or incorporated into) the base member. The induction coil may be located in (for example be attached to or incorporated into) the sealing member.

The induction coil may extend around at least a portion of, for example the majority of, for example substantially all of, the perimeter (e.g. the edge) of the cavity in which, in use, the contact lens is stored. In the case that the contact lens is, in use, stored within a recess formed in the base member of a blister pack, the induction coil may extend around at least a portion of, for example the majority of, for example substantially all of, the perimeter of said recess. Thus, in the case that the cavity has circular or truncated circular perimeter, the induction coil may be any of a full or partial annulus.

The charging circuitry may include a second induction coil electromagnetically coupled to the first induction coil. The first and second induction coils may have the same resonant frequency.

The charging circuitry may comprise a switch arranged to control the operation of the charging circuitry. The switch may be arranged such that when the switch is in the closed position the circuitry can operate to wirelessly charge an electronic device contained within a contact lens stored in the blister package. It may be that when the switch is in the closed (on) position current can flow from the battery to the induction coil. It may be that when the switch is in the open (off) position current is prevented from flowing from the battery to the induction coil. The switch may comprise a tab and/or button. The switch may comprise a detachable portion arranged such that detaching said portion from the blister pack initiates charging of the electronic device.

The base member of the blister package may include at least part of the charging circuitry. It may be that the base member comprises all of the charging circuitry. Thus, in one aspect, the invention may provide a base member comprising at least part of, for example all of, the charging circuitry.

The sealing member of the blister package may include at least part of the charging circuitry. It may be that the sealing member comprises all of the charging circuitry. In the case that a single member forms the sealing member for a plurality of blister packages, the single member may comprise at least part of the charging circuitry for a plurality of blister packages and/or some elements of the charging circuity may be shared between multiple blister packages. Thus, in one aspect, the invention may provide a sealing member comprising at least part of, for example all of, the charging circuitry for one or more blister packages.

The base members of the present packages can be made from a variety of materials, for example plastic, for example thermoplastic, materials. In certain embodiments, the base member is an injection molded polyolefin material. For example, some of the base members, including the illustrated base members, are formed from polypropylene. The base members can be made by any conventional technique. In the illustrated embodiment, the base members are injection molded elements. In other embodiments, the base members may be thermoformed.

A contact lens including an electronic device may be located within the cavity of the blister package.

A contact lens for use with the blister package of the present disclosure may comprise one or more electronic components. The electronic component(s) of the contact lens may form part of an electronic device. The electronic device may comprise receiving circuitry arranged to receive power from the charging circuitry that forms part of the blister pack.

The receiving circuitry may comprise a contact lens power source arranged to provide power to an electronic component located within the contact lens. The contact lens power source may comprise a battery, capacitor or other element arranged to store the power received from the charging circuit. The power source of the contact lens may have a lesser capacity for storing charge as compared to the power source of the blister pack. It may be that the power source of the blister pack can store a greater quantity of charge than the power source of the contact lens. It may be that the power source of the blister pack can retain a given amount of charge for a longer period than the power source of the contact lens. The power source of the contact lens may have a higher leakage rate than the power source of the blister pack.

The receiving circuitry may comprise a receiving induction coil arranged to receive power from the induction coil, or each of the induction coils, of the charging circuitry. It may be that an alternating current is induced in the receiving induction coil by an alternating magnetic field produced by the induction coil, or each of the induction coils, of the charging circuitry.

The receiving circuitry may comprise an AC/DC converter. The AC/DC converter may be arranged to convert an alternating current produced by the receiving induction coil into a direct current for storage by the contact lens power source.

The second aspect provides a method of providing a charge to an electronic device contained within a contact lens. The method comprises sealing the contact lens into a blister package comprising charging circuitry configured to charge the electronic device.

The third aspect provides a method of manufacturing a packaged electronic contact lens. The contact lens, such as a hydrogel or silicone hydrogel contact lens, containing one or more electronic components, is placed in a cavity of a blister pack comprising charging circuitry configured to charge the electronic device. The blister pack is sealed with the contact lens contained within the cavity.

The charging circuitry may comprise a power source, as discussed above. The method may comprise charging the power source after the contact lens has been sealed into the blister package.

There may be a significant delay, for example a delay of several weeks or a small number of months (e.g. 1 or 2 months), between the sealing of a contact lens into the blister package and the charging of the power source. Thus, the step of charging the power source may take place more than one month after the blister package is sealed. The charging of the power source may take place immediately before the contact lens is dispatched to the end user.

There may be a significant delay, for example a delay of several weeks or a number of months (e.g. 1 to 4 months), between the charging of the power source and the charging of the electronic device located within the contact lens. For example, the charging of the electronic device located within the contact lens may take place more than a month, for example more than two months, after the charging of the power source. The power source may be charged in the manufacturing facility where the blister pack is sealed. The power source may be charged at a distribution center forming part of the distribution chain downstream of the manufacturing facility.

The method may comprise the step of activating the charging circuitry, for example closing a switch, in order to charge the electronic device. There may be a significant delay, for example a delay of several weeks or a number of months (e.g. 1 to 4 months), between the charging of the power source and the activation of the charging circuitry. Thus, the step of activating the charging circuitry (i.e. charging the electronic device) may take place more than one month after charging the power source.

The blister package and contact lens may be arranged such that charging of the contact lens power source takes a small number of hours (e.g. 1 to 12 hours, for example 2 to 6 hours). Thus, it may be that an end user activates the charging circuitry in the evening in order to prepare the contact lens for use the following morning.

The contact lens of the present disclosure is understood to include any ophthalmic lens that can be worn directly on the eye. A contact lens according to the present disclosure may be a corrective contact lens, for example, used to treat a condition selected from myopia, hyperopia, astigmatism, presbyopia, and color deficiencies. Alternatively or additionally a contact lens may be cosmetic, i.e. designed to change the appearance, for example, the color, of the eye. Alternatively or additionally, a contact lens of the present disclosure may be a therapeutic contact lens, for example, a contact lens used to protect a damaged or diseased cornea. A contact lens of the present disclosure may be a sensor, for example to monitor the health or a biological signal of the wearer. It will be appreciated that, with appropriate modification, the present methods may also be useful for the manufacture of other types of ophthalmic lenses.

The contact lens of the present disclosure may be a hydrogel contact lens. The hydrogel contact lens may be a silicone hydrogel contact lens or non-silicone hydrogel contact lens. The contact lens of the present disclosure may be a disposable and/or single use lens. The contact lens of the present disclosure may be a silicone elastomer contact lens.

With reference to the drawings, FIG. 1 shows a schematic plan view of part of a blister package 1 in accordance with an example embodiment of the present invention. The blister package 1 comprises a plastic base 2 which appears rectangular when the upper surface is viewed in plan in FIG. 1. A bowl-like lens recess 4, which appears as a truncated circle when viewed in plan in FIG. 1, is formed towards a first end of the base 2. The other end of the base has a substantially flat surface region 2a. A battery cell 6 located in the flat surface region of the base is connected by two conductive paths 8 to the input side of a DC/AC converter 10, also located in the flat surface region. A tab switch 12 is located between the battery 6 and the converter 10 on one of the conductive paths 8. An annular transmitting induction coil 14 extends around the perimeter of the lens recess 4 and is connected by two conductive paths 8 to the output side of the DC/AC converter 10. A foil lid (not shown in FIG. 1) extends over the upper surface of the blister pack and is heat sealed to the surface such that the recess 4 and lid together form a cavity in which a contact lens 20 can be stored. A dashed line denotes the location of a contact lens 20, within the recess 4 in FIG. 1.

Figure 2:
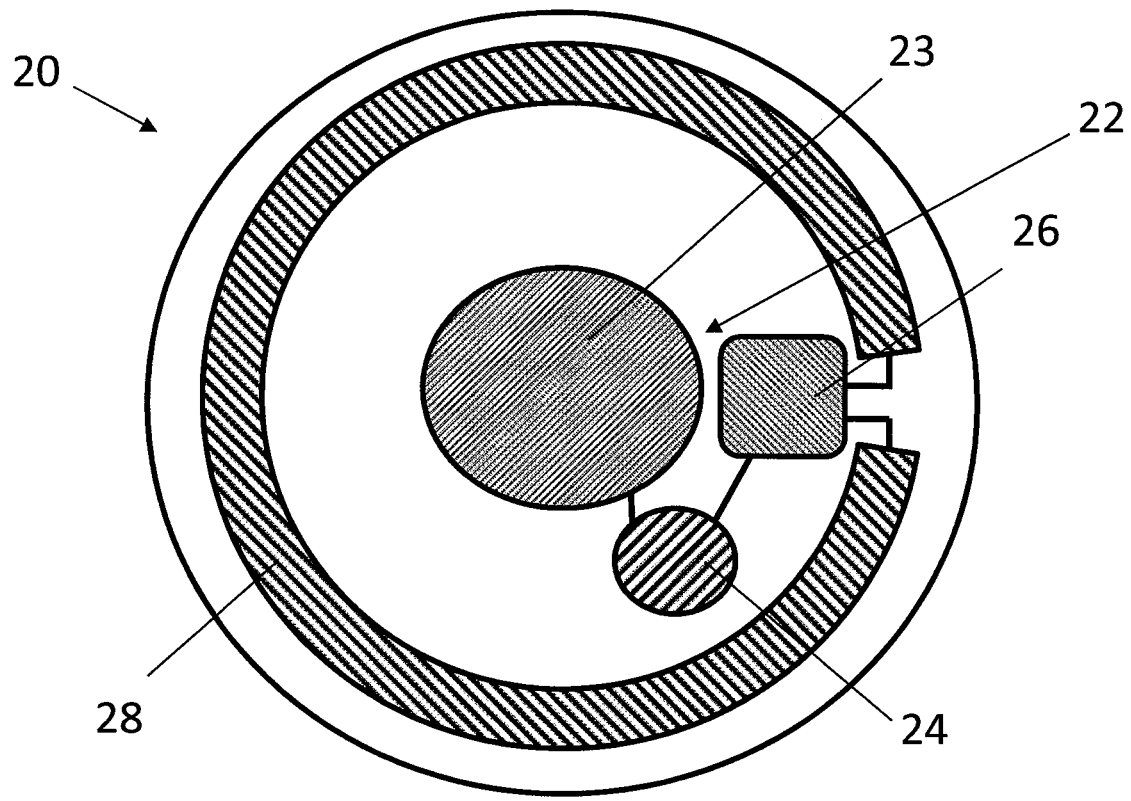
FIG. 2 is a schematic plan view of a contact lens for storage in the blister package of the first embodiment.

FIG. 2 shows a schematic plan view of a contact lens 20 for storage in the blister pack 1 of the first embodiment. Located within the contact lens 20 is an electronic device 22. The electronic device includes an electronic component 23 powered by a battery 24. The electronic device 22 further includes an AC/DC converter 26. The battery 24 is connected to the AC/DC converter 26 which is in turn connected to an annular receiving induction coil 28 extending circumferentially around a peripheral portion of the lens 20.

Figure 3:
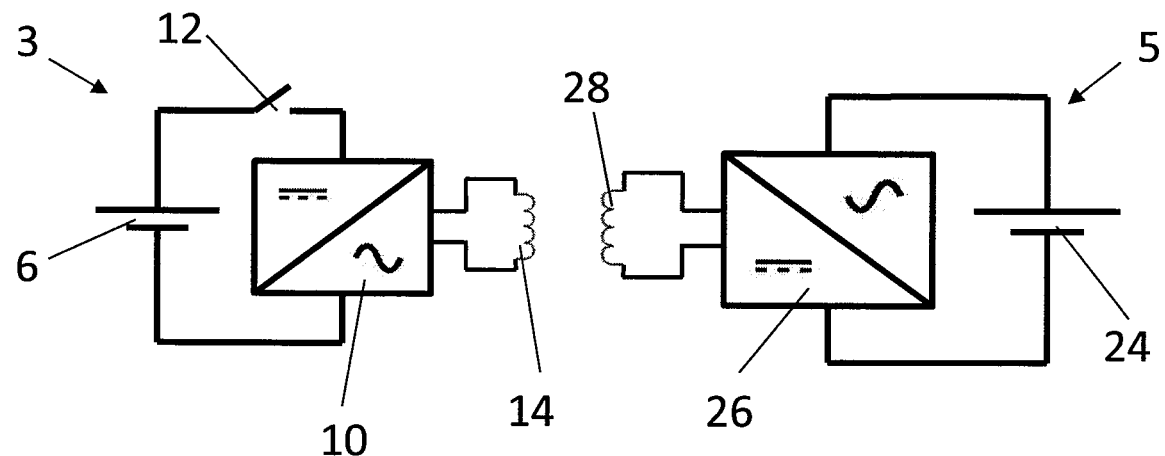
FIG. 3 shows a circuit diagram for use in the first embodiment.

FIG. 3 shows a circuit diagram for the blister package and contact lens of the first embodiment. The circuit diagram shows the charging circuitry 3 (located in a blister package 1, not shown in FIG. 3) and receiving circuitry 5 (located in the contact lens 20, not shown in FIG. 3). The charging circuit comprises a battery 6, a switch 12, a DC/AC converter 10 and an inductor 14. The battery 6, switch 12 and DC/AC converter 10 are connected in series. The inductor 14 is connected to the output of the DC/AC converter 10. The receiving circuit comprises a battery 24, an AC/DC converter 26 and an inductor 28. The battery 24 and AC/DC converter 26 of the receiving circuit are connected in series. The inductor 28 is connected to the input of the AC/DC converter 26. It will be appreciated that other elements may be included in both the charging circuit and the receiving circuit.

In use, the battery cell 6 is charged shortly before the sealed blister pack is dispatched to the end user. Prior to using the contact lens 20, for example the night before using the contact lens 20, the end user presses the tab switch 12 to begin charging the contact lens battery 24. Closing the switch 12 allows direct current to flow from the blister pack battery 6 to the converter 10. The converter then outputs an alternating current to the transmitting coil 14 which causes the coil to produce an alternating electromagnetic field. As the coil 14 extends around the perimeter of the recess 4, the field produced by the antenna 14 extends across the cavity in which the contact lens 20 is stored. This electromagnetic field produced by the transmitting coil 14 induces an alternating current in the receiving coil 28 of the contact lens 20, which is then converted to a DC current by the AC/DC convertor 26 before being stored in the contact lens battery 24. The lens 20 may be left to charge overnight. Once the contact lens battery 24 is charged the user can unseal the blister package 1 by removing the foil lid and then use the lens 20, with the contact lens battery 24 powering the electronic component 23 of the electronic device 22.

While the present invention has been described and illustrated with reference to particular embodiments, it will be appreciated by those of ordinary skill in the art that the disclosure lends itself to many different variations not specifically illustrated herein.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the invention, may not be desirable, and can therefore be absent, in other embodiments.

The invention claimed is:

1. A contact lens blister package for storage of contact lenses prior to first use of the lens, the package comprising (i) a cavity for storing a contact lens and (ii) charging circuitry configured to charge an electronic device forming part of a contact lens stored in said cavity, wherein the charging circuitry comprises a power source that is a battery or other element arranged to retain an electrical charge and wherein the charging circuitry comprises a switch arranged to control the operation of the charging circuitry, wherein the package is a blister package for storage of contact lenses prior to first use of the lens, and wherein the switch comprises a detachable portion arranged such that detaching said portion from the blister pack initiates charging of the electronic device.

2. The contact lens blister package according to claim 1, wherein the power source is a battery and the charging circuitry includes a DC/AC inverter arranged to turn direct current from the battery into alternating current.

3. The contact lens blister package according to claim 1, wherein the charging circuitry is configured to charge the electronic device wirelessly.

4. The contact lens blister package according to claim 3, wherein the charging circuitry includes a first induction coil arranged to receive current from a power source and to provide power wirelessly to the electronic device.

5. The contact lens blister package according to claim 4, wherein the first induction coil extends around at least a portion of the perimeter of the cavity.

6. The contact lens blister package according to claim 4, wherein the electronic device includes a second induction coil electromagnetically coupled to the first induction coil, the first and second induction coils preferably having the same resonant frequency.

7. The contact lens blister package according to claim 1, wherein the blister package includes a base member, wherein the base member includes at least part of the charging circuitry.

8. The contact lens blister package according to claim 1, wherein the blister package includes a sealing member, wherein the sealing member includes at least part of the charging circuitry.

9. The contact lens blister package according to claim 1, wherein the blister package further comprises a contact lens including an electronic device being located within the cavity.

10. A method of providing a charge to an electronic device contained within a contact lens, the method comprising sealing the contact lens into a blister package, to obtain the contact lens bluster package of claim 2.

11. The method according to claim 10, wherein the charging circuitry comprises a power source, and the method comprises charging the power source after the contact lens has been sealed into the blister package.

12. The method according to claim 11, wherein said charging the power source takes place more than one month after the blister package is sealed.

13. The method according to claim 10, wherein the method comprises activating the charging circuitry in order to charge the electronic device.

14. The method according to claim 13, wherein said activating the charging circuitry takes place more than one month after charging the power source.

15. A method of manufacturing a packaged electronic contact lens, the method comprising placing the contact lens, containing one or more electronic components, in a cavity of a blister pack comprising charging circuitry configured to charge the electronic device, and then sealing the blister pack with the contact lens contained within the cavity.

16. An array of contact lens blister packages, said array comprising two or more contact lens blister packages coupled together, wherein each of the two or more contact lens blister packages are for storage of a single contact lens prior to first use of the lens, and comprising (i) a cavity for storing a contact lens and (ii) charging circuitry configured to charge an electronic device forming part of a contact lens stored in said cavity, wherein the charging circuitry comprises a power source that is a battery or other element arranged to retain an electrical charge and wherein the charging circuitry comprises a switch arranged to control the operation of the charging circuitry, and wherein the switch comprises a detachable portion arranged such that detaching said portion from the blister pack initiates charging of the electronic device.

\* \* \* \* \*

UNITED STATES PATENT AND TRADEMARK OFFICE
CERTIFICATE OF CORRECTION

PATENT NO. : 11,338,976 B2
APPLICATION NO. : 16/086015
DATED : May 24, 2022
INVENTOR(S) : Oag et al.

It is certified that error appears in the above-identified patent and that said Letters Patent is hereby corrected as shown below:

In the Claims

Claim 10, Column 8, Line 22, "contact lens bluster package of claim 2." should read -- contact lens blister package of claim 1. --

Signed and Sealed this
Twelfth Day of July, 2022

Katherine Kelly Vidal
*Director of the United States Patent and Trademark Office*